United States Patent [19]
Gottlieb

[11] Patent Number: 6,123,026
[45] Date of Patent: *Sep. 26, 2000

[54] SYSTEM AND METHOD FOR INCREASING THE DURABILITY OF A SAPPHIRE WINDOW IN HIGH STRESS ENVIRONMENTS

[75] Inventor: James H. Gottlieb, Tucson, Ariz.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/914,842

[22] Filed: Aug. 19, 1997

Related U.S. Application Data

[60] Provisional application No. 60/030,520, Nov. 12, 1996.

[51] Int. Cl.$^7$ ........................................ F42B 15/34
[52] U.S. Cl. ................................................ 102/293
[58] Field of Search ............................ 342/53; 359/350, 359/355, 356; 250/353; 244/3.16, 3.17, 3.18; 102/293; 343/872

[56] References Cited

U.S. PATENT DOCUMENTS

| | | | |
|---|---|---|---|
| 3,924,826 | 12/1975 | Reinert | 244/3.16 |
| 3,981,818 | 9/1976 | Swinehart et al. | 359/350 |
| 4,080,534 | 3/1978 | Guggenheim et al. | 250/338 |
| 4,930,731 | 6/1990 | Roy et al. | 244/3.16 |
| 5,075,797 | 12/1991 | Jones | 359/350 |
| 5,134,518 | 7/1992 | Letter | 359/350 |
| 5,206,083 | 4/1993 | Raj et al. | 428/323 |
| 5,245,189 | 9/1993 | Satoh et al. | 250/343 |
| 5,368,254 | 11/1994 | Wickholm | 244/3.16 |
| 5,372,333 | 12/1994 | Uwira et al. | 244/3.16 |
| 5,404,814 | 4/1995 | Fisch et al. | 102/293 |
| 5,425,983 | 6/1995 | Propst et al. | 428/216 |
| 5,647,560 | 7/1997 | Schnatz et al. | 244/3.15 |
| 5,693,907 | 12/1997 | Rudnik | 102/293 |

FOREIGN PATENT DOCUMENTS

| | | | |
|---|---|---|---|
| 369958 | 5/1990 | European Pat. Off. | 102/293 |

*Primary Examiner*—Charles T. Jordan
*Assistant Examiner*—Denise J Buckley
*Attorney, Agent, or Firm*—Glenn H. Lenzen; Andrew J. Rudd; William J. Benman

[57] ABSTRACT

A dome assembly (50) adapted for use with a missile (32) having a longitudinal axis (42) parallel to a thrust vector thereof. The inventive dome (50) includes a crystal (30, 50) having a crystallographic structure that includes a plurality of planes (12, 14, 16), one of said planes (14) being more susceptible to failure than one or more of the other planes (12, 16). A surface around a missile sensor provides a place for mounting the crystal (30, 50) so that said plane susceptible to failure (14) faces approximately opposite to that of a positive velocity vector (34) of said missile (32). In a more specific embodiment, the crystal (30, 50) is a sapphire crystal (30, 50) having a crystallographic structure that includes positive n-planes (12), positive r-planes (14), and a c-plane (16). By design at nominal conditions, an r-plane (14) is approximately bisected by a plane formed by the normal of the c-plane (16) and a wind flow vector (36) parallel to a thrust vector of said missile (32). A turntable (not shown) orients the sensor dome (50) so that a first r-plane (14) faces leeward of impinging airflow (36) corresponding to the wind flow vector (36). An r-plane normal (38) of a second r-plane forms an angle of approximately 60 degrees with respect to impinging airflow (36) that is approximately parallel to the thrust vector of the missile (32). The turntable includes a motor (not shown) for strategically orienting the lattice planes (12, 14, 16) of the dome (50) so as to maximize the strength of the dome (50) with respect to applied stresses.

14 Claims, 2 Drawing Sheets

SYSTEM AND METHOD FOR INCREASING THE DURABILITY OF A SAPPHIRE WINDOW IN HIGH STRESS ENVIRONMENTS

This application claims priority from provisional application No. 60/030,520, filed Nov. 12, 1996.

BACKGROUND OF THE INVENTION

1. Field of Invention

This invention relates to missile systems. Specifically, the present invention relates to methods for preventing sapphire sensor housings and windows from cracking during missile flight.

2. Description of the Related Art

Advanced missile systems are used in a variety of applications ranging from explosives delivery to satellite launching. Such applications typically have stringent performance requirements. Missile sensing and tracking capability are important features affecting missile performance.

A missile may be equipped with a combination of infrared, radar, and optical sensors for missile guidance i.e., terminal homing. The sensors and accompanying sensor housings are often exposed to extreme heat loads. Sensor damage, and signal blockage often result. This is particularly true for infrared (IR) sensors. Typically an IR sensor is encased in a sapphire housing called an IR dome. At the high speeds required by many missiles, an IR dome will create a strong bow shock that results in a large pressure gradient and corresponding temperature heat load. This heating may crack the IR dome. Any resulting fracturing of the IR dome due to local heating may reduce missile performance.

To reduce the extreme temperature loads on the IR sensors and domes, a system using cooling gas was developed. Typically the system includes a pressurized canister of argon stored in the missile body. When the heat load on the IR dome becomes large, cold gas is released from the canister through a nozzle just forward of the IR dome. Unfortunately, the cold argon gas has a different refractive index than air and bends signals entering the IR dome resulting in missile tracking errors. Also, the canisters are bulky. The excess weight reduces the range of the missile, and space constraints due to the canister increase the complexity and price of the missile system. In addition, timing of the gas release with the heat load on the IR dome is difficult.

Other methods for protecting the missile from extreme heat loads and damage due to weather and particles include reducing the speed of the missile and reducing the exposure time of the IR dome. Both methods reduce missile performance. Additional methods also include placing protuberances forward of the IR dome to reduce heat loads on the IR dome. Such methods however add additional cost and weight to the missile.

Hence, there exists a need in the art for cost-effective, space-efficient system and method for preventing or reducing the cracking of missile sensor housings and windows without reducing missile performance.

SUMMARY OF THE INVENTION

The need in the art is addressed by the sensor dome assembly of the present invention. In the illustrative embodiment, the inventive assembly is adapted for use with a missile having a longitudinal axis parallel to a thrust vector thereof. The assembly includes a single crystal dome or window with a crystallographic structure having plural beveled facets. A surface around a missile sensor provides a place for mounting the crystal such that it can be oriented in a clocking manner to minimize the resolved shear stresses on those facets which correspond to crystallographic r-planes.

In a specific embodiment, the dome or window is mounted on the side of a missile and the crystal is sapphire and has a, c, r and n-planes. The positive direction of a c-plane normal vector is approximately perpendicular to the base of the infrared dome and points outward from the missile towards and through the center of the dome or window. Also, a positive r-plane normal is defined to be one in which the projected component of that r-plane normal onto the c-plane normal vector is in the direction of the positive c-plane normal.

In the preferred orientation, an r-plane is approximately bisected by a plane formed by a wind flow vector and a crystallographic c-axis. The positive normal to this r-plane has a component that faces aft.

In the illustrative embodiment, the inventive system is adapted for use with infrared missile sensor domes and includes an x-ray device for locating the r-planes planes within the sensor dome. A turntable orients the sensor dome to the preferred orientation in which the first r-plane normal is rotated to the leeward direction. The projection of an r-plane normal of the second r-plane onto the c-plane forms an angle of approximately 60 degrees with respect to impinging airflow when projected to the same plane. The turntable includes a motor for strategically orienting the lattice planes of the dome so as to maximize the strength of the dome with respect to applied stresses.

BRIEF DESCRIPTION OF THE DRAWINGS

FIG. 1b is a top view of the sapphire crystal of FIG. 1a.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1B:
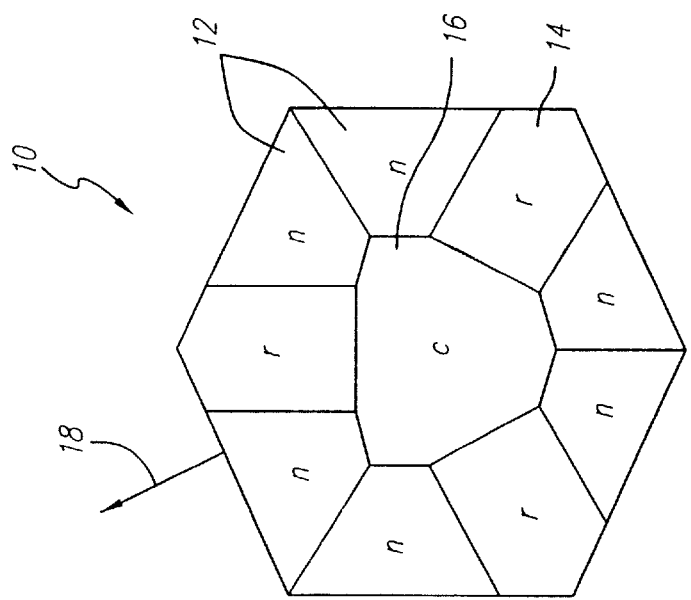
Figure 1A:
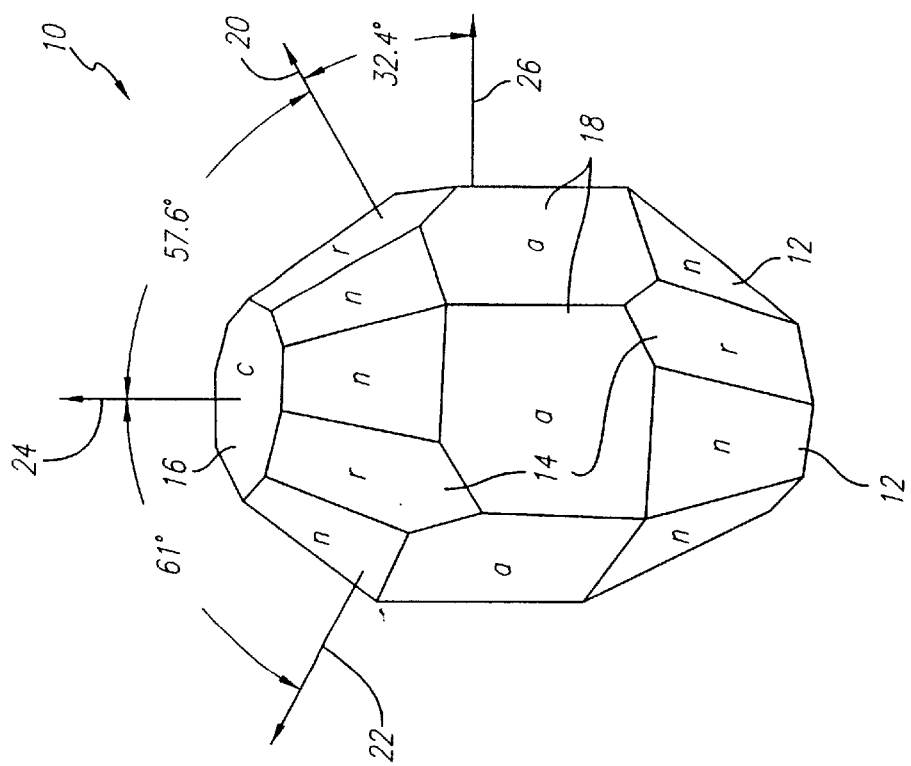
FIG. 1a is an isometric view of a sapphire crystal showing the relative orientation of lattice planes.

FIG. 1a is an isometric view of a typical sapphire crystal 10 showing the relative orientation of n-planes 12, r-planes 14, a c-plane, 16 and a-planes 18. When manufacturing a sensor window such as an IR dome, the crystal 10 is grown and then machined to the desired shape.

Figure 2:
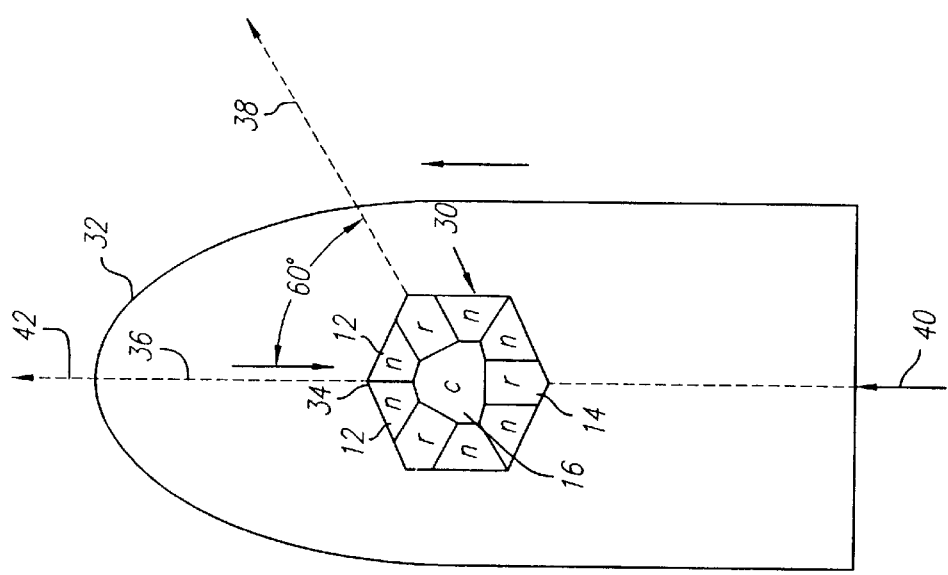
FIG. 2 is an illustrative diagram showing the orientation of lattice planes of a sapphire crystal with respect to missile direction and airflow for a sapphire dome according to the teachings of the present invention.

Typically, the crystal 10 is scooped from a large cylindrical boule using specialized machinery. The resulting near net shaped dome (not shown) is then ground and polished to its final dimensions. The finished dome (see FIG. 3), although smooth, still has a crystallographic structure as represented by the crystal 10. FIGS. 1a, 1b, and 2 represent only the orientation and directions of the crystallographic planes within the final sapphire product. Specific c-facets, r-facets, a-facets, and n-facets corresponding to the c-plane 16, r-planes 14, a-planes 18, and n-planes 12, respectively, exist throughout the resulting dome in a near infinite multiplicity. Planes (not shown) parallel to the planes 14, 16, 18 are defined to be the same planes 14, 16, 18 respectively. For example, there exists three a-planes 18, three r-planes 14, one c-plane 16 and six n-planes 12.

The primary mode of dome fracture and failure at the high temperatures experienced during missile flight is due to shear stress resolved along on one or more of the crystallographic r-planes 14 throughout the machined dome or window (not shown).

The r-planes 14, n-planes 12, and the c-plane 16 of the crystal 10 have normal vectors termed r-plane normals 20, n-plane normals 22 and the c-plane normal 24 respectively. The c-plane normals 24 are angled approximately 57.6 degrees with respect to the r-plane normals 20 and approximately 61 degrees with respect to the n-plane normals 22. The r-plane normals 20 are angled with respect to an m-axis (denoted (m)) represented by a vector 26 by approximately 32.4 degrees. The m-axis 26 is perpendicular to the c-plane normal 24. The c-plane normal 24 is normal to the c-plane 16 and corresponds to a c-axis 24.

For the purposes of conveying a complete and accurate understanding of the invention described herein, the following define certain basic conventions:

1. The positive direction of the c-plane normal 24 is defined to be in the direction from the infrared sensor (not shown) internal to the missile (see FIG. 3) and perpendicular to the c-plane 16 toward and through the center of the dome or window (see FIG. 3) to the exterior environment.

2. A positive r-plane normal 20 is defined to be one in which the projected component of that r-plane normal onto the c-plane normal vector 24 is in the direction of the positive c-plane normal 24.

FIG. 1b is a top view of the sapphire crystal 10 of FIG. 1a. FIG. 1b represents the crystalline structure of a typical IR dome (not shown). This view is from the positive c-axis (see 24 of FIG. 1a) looking in the direction of the negative c-axis. Typically, such infrared (IR) domes are machined and placed on missiles without regard to the structural orientation of the crystal 10 except for the orientation of the c-axis. The orientation of the n-planes 12, r-planes 14, a-planes, and is random.

FIG. 2 is an illustrative diagram showing the orientation of lattice planes of a sapphire crystal piece 30 with respect to a missile 32 direction and air flow for a sapphire dome (not shown) according to the teachings of the present invention. A vector 34, which points opposite to the direction of wind flow 36, is parallel to the c-plane 16. The vector 34 forms an angle of approximately 60 degrees with the projection of the positive r-plane normal 38 onto the c-plane 16. Shear stresses (not shown) resolved along the r-planes 14 are reduced.

The positive normal to the r-plane 14 points aft. The negative r-plane normal intersects the nominal wind flow vector 36. The wind flow vector 36 is aligned with the longitudinal missile axis 42 for a nominal no-yaw, no-pitch flight. The longitudinal axis 42 is parallel to a thrust vector 40.

Figure 3:
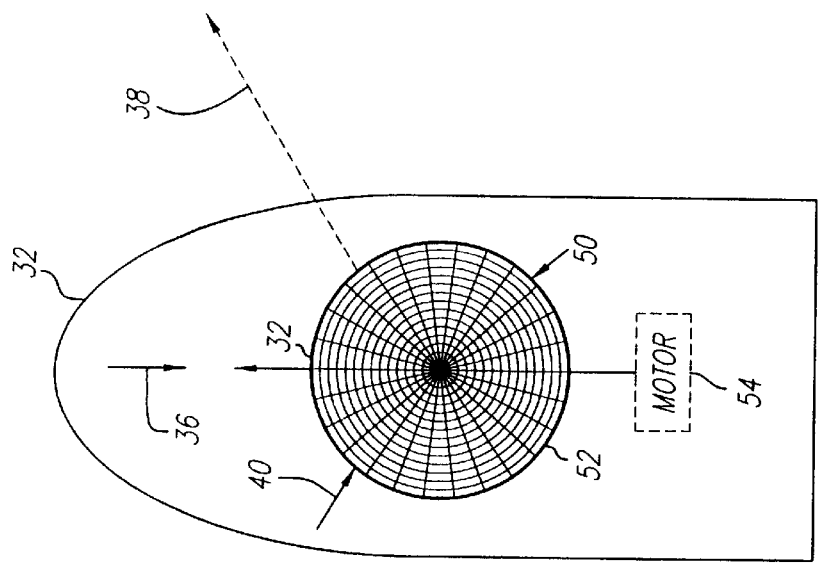
FIG. 3 is a top view of an IR dome machined and oriented so that its lattice plane orientation corresponds to the lattice plane orientation of the sapphire crystal of FIG. 2.

FIG. 3 is a diagram of an infrared (IR) dome 50 machined and oriented so that its lattice plane orientation corresponds to the lattice plane orientation of the sapphire crystal of FIG. 2. The dome 50 is cut and machined from a single large sapphire crystal. The dome 50 has the same structural orientation with respect to the crystal lattice planes, i.e., the a-planes, r-planes, n-planes, and the c-plane as the schematic crystal 30 of FIG. 2. For example, the projection of the r-plane normal 38 onto the c-plane (see 16 of FIG. 2) forms approximately a 60 degree angle with respect to the impinging airflow vector (see 36 of FIG. 2).

The IR dome 50 is mounted on a turntable 52. The turntable includes a motor 54 for orienting the lattice planes of the IR dome so as to maximize the strength of the IR dome with respect to applied stresses.

The method according to the teachings of the present invention comprises the steps of:

1. obtaining a sapphire crystal of sufficient size for a particular IR dome or window application,
2. machining the crystal to the appropriate dimensions for the particular application,
3. x-raying the crystal to determine the orientations of the r-planes within the crystal, and
4. orienting the r-planes so they are exposed to the least amount of shear stress possible when exposed to the operating environment.

An alternative method according to the teachings of the present invention comprises the steps of:

1. obtaining prefabricated sapphire crystal IR dome or window,
2. x-raying the dome or window to determine the locations of the r-planes within the dome or window, and
3. orienting the r-planes so they are exposed to the least amount of shear stress possible in the particular operating environment.

A second alternative method according to the teachings of the present invention comprises the steps of:

1. obtaining prefabricated single crystal sapphire IR dome,
2. x-raying the dome or window to determine the orientations of the r-planes within the dome or window, and
3. attaching the dome to a missile so that one of the positive r-plane normals is directed leeward to impinging airflow and corresponding induced stresses during missile flight.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A dome assembly for a missile having a longitudinal axis parallel to a thrust vector thereof, said dome assembly comprising:

a crystal having a crystallographic structure that includes a plurality of planes, one of said planes being more susceptible to failure than one or more of the other planes and means for mounting said crystal so that said plane susceptible to failure faces approximately opposite to that of a positive velocity vector of said missile.

2. The invention of claim 1 wherein a projection of a positive normal of said plane susceptible to failure onto a wind flow vector that is approximately parallel to a thrust vector of said missile points approximately aft.

3. The invention of claim 1 wherein a projection of a positive normal of said plane susceptible to failure onto said missile axis points approximately in a direction of a thrust vector of said missile.

4. The invention of claim 1 wherein said crystal includes a positive r-plane corresponding to said plane susceptible to failure, a positive n-plane, a c-plane, and an additional positive r-plane, and a projection onto said c-plane of a positive normal of said additional positive r-plane is oriented approximately 60 degrees with respect to a vector that is approximately parallel to a velocity vector of said missile.

5. The invention of claim 1 wherein said crystal includes plural r-planes and a c-plane, and one of said r-planes is approximately bisected by a plane formed by said positive velocity vector and normal of said c-plane.

6. The invention of claim 1 wherein said sapphire crystal includes a c-plane, and a projection onto the c-plane of the positive normal of said plane susceptible to failure is approximately parallel to a thrust vector of said missile and points aft.

7. The invention of claim 1 wherein said plane susceptible to failure is intersected by said longitudinal axis and faces aft.

8. The invention of claim 1 wherein said dome assembly includes a sapphire window comprising said crystal.

9. The invention of claim 1 wherein said dome assembly is an IR dome.

10. The invention of claim 9 wherein said IR dome is mounted on a turntable.

11. The invention of claim 10 wherein said turntable includes a motor for orienting said plurality of planes of said IR dome so as to maximize the strength of said IR dome with respect to applied stresses.

12. A system for increasing the reliability of a missile targeting and aiming system comprising:

a sensor dome included on a missile and having a uniform r-plane orientation and adjacent or intersecting n-planes and means for maintaining said sensor dome in a position such that an intersecting edge of two n-planes of said dome faces approximately in a direction of a thrust vector of said missile so that an r-plane of said dome faces aft.

13. A system for protecting sensors on a missile comprising:

an infrared dome and means for mounting said dome to said missile so that a normal vector to a crystal r-plane of said dome forms an angle of approximately 60 degrees with respect to a longitudinal axis of said missile.

14. A method for increasing the durability of a sapphire missile sensor dome comprising the steps of:

obtaining a prefabricated crystal IR dome;

x-raying said dome or window to determine the location planes of said crystal most susceptible to failure; and orienting said dome so that at least one of said planes most susceptible to failure faces a direction opposite to that of a non-zero velocity vector of said missile.

* * * * *

UNITED STATES PATENT AND TRADEMARK OFFICE
CERTIFICATE OF CORRECTION

| | |
|---|---|
| PATENT NO. | : 6,123,026 |
| APPLICATION NO. | : 08/914842 |
| DATED | : September 26, 2000 |
| INVENTOR(S) | : James H. Gottlieb |

It is certified that error appears in the above-identified patent and that said Letters Patent is hereby corrected as shown below:

Col. 1, lines 3-5, below the title, insert the following

--This invention was made, at least in part, with Government support under Contract No. N00024-96-C-5341 awarded by the United States Department of the Navy, Naval Sea Systems Command. The Government may have certain rights in this invention.--

Signed and Sealed this

Seventeenth Day of July, 2007

JON W. DUDAS
*Director of the United States Patent and Trademark Office*